United States Patent
Gupta et al.

(10) Patent No.: US 12,332,373 B2
(45) Date of Patent: Jun. 17, 2025

(54) NOISE ESTIMATION WITH SIGNAL RAMPS FOR RADAR

(71) Applicant: QUALCOMM Incorporated, San Diego, CA (US)

(72) Inventors: Anant Gupta, San Diego, CA (US); Roberto Rimini, San Diego, CA (US); Sheng-Yuan Tu, San Diego, CA (US); Ahmad Bassil Zoubi, San Diego, CA (US); Neevan Ramalingam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 357 days.

(21) Appl. No.: 17/649,259

(22) Filed: Jan. 28, 2022

(65) Prior Publication Data

US 2023/0273296 A1 Aug. 31, 2023

(51) Int. Cl.
*G01S 7/02* (2006.01)
*G01S 7/03* (2006.01)
*G01S 7/292* (2006.01)
*G01S 13/89* (2006.01)

(52) U.S. Cl.
CPC ............ *G01S 7/2927* (2013.01); *G01S 7/023* (2013.01); *G01S 7/03* (2013.01); *G01S 13/89* (2013.01)

(58) Field of Classification Search
CPC .......... G01S 7/2927; G01S 7/023; G01S 7/03; G01S 13/89
USPC ........................................................ 342/93
See application file for complete search history.

(56) References Cited

U.S. PATENT DOCUMENTS

| 9,229,102 | B1* | 1/2016 | Wright | G01S 13/885 |
| 10,386,471 | B1* | 8/2019 | Giampaolo | G01S 15/586 |
| 2015/0084808 | A1* | 3/2015 | Vacanti | G01S 13/343 |
| | | | | 342/128 |
| 2015/0226848 | A1* | 8/2015 | Park | G01S 13/584 |
| | | | | 342/93 |
| 2019/0353750 | A1* | 11/2019 | Rimini | H04B 1/3838 |
| 2019/0383925 | A1* | 12/2019 | Gulati | G01S 13/347 |

(Continued)

FOREIGN PATENT DOCUMENTS

CN    108132461 A    6/2018

OTHER PUBLICATIONS

International Search Report and Written Opinion—PCT/US2023/060297—ISA/EPO—Apr. 26, 2023.

*Primary Examiner* — James R Hulka
*Assistant Examiner* — Samarina Makhdoom
(74) *Attorney, Agent, or Firm* — Harrity & Harrity, LLP

(57) ABSTRACT

Various aspects of the present disclosure generally relate to wireless communication. In some aspects, a wireless device may transmit a frequency-modulated continuous-waveform (FMCW) dual ramp radar signal over a time duration that sweeps from a first frequency to a second frequency and from the second frequency to the first frequency. The wireless device may receive a reflection of the radar signal with a first reflected part that corresponds to the first part of the radar signal and a second reflected part that corresponds to the second part of the radar signal. The wireless device may compare the first reflected part and a time-inverted version of the second reflected part to estimate a noise pattern. The wireless device may perform an action based at least in part on the noise pattern. Numerous other aspects are described.

30 Claims, 7 Drawing Sheets

(56) References Cited

U.S. PATENT DOCUMENTS

| | | | |
|---|---|---|---|
| 2020/0049812 A1* | 2/2020 | Jansen | G01S 13/343 |
| 2020/0124699 A1 | 4/2020 | Meissner et al. | |
| 2021/0003662 A1* | 1/2021 | Aydogdu | G01S 13/343 |
| 2021/0141052 A1* | 5/2021 | Hsiao | G01S 7/354 |
| 2021/0356558 A1* | 11/2021 | Fuchs | G01S 7/356 |

* cited by examiner

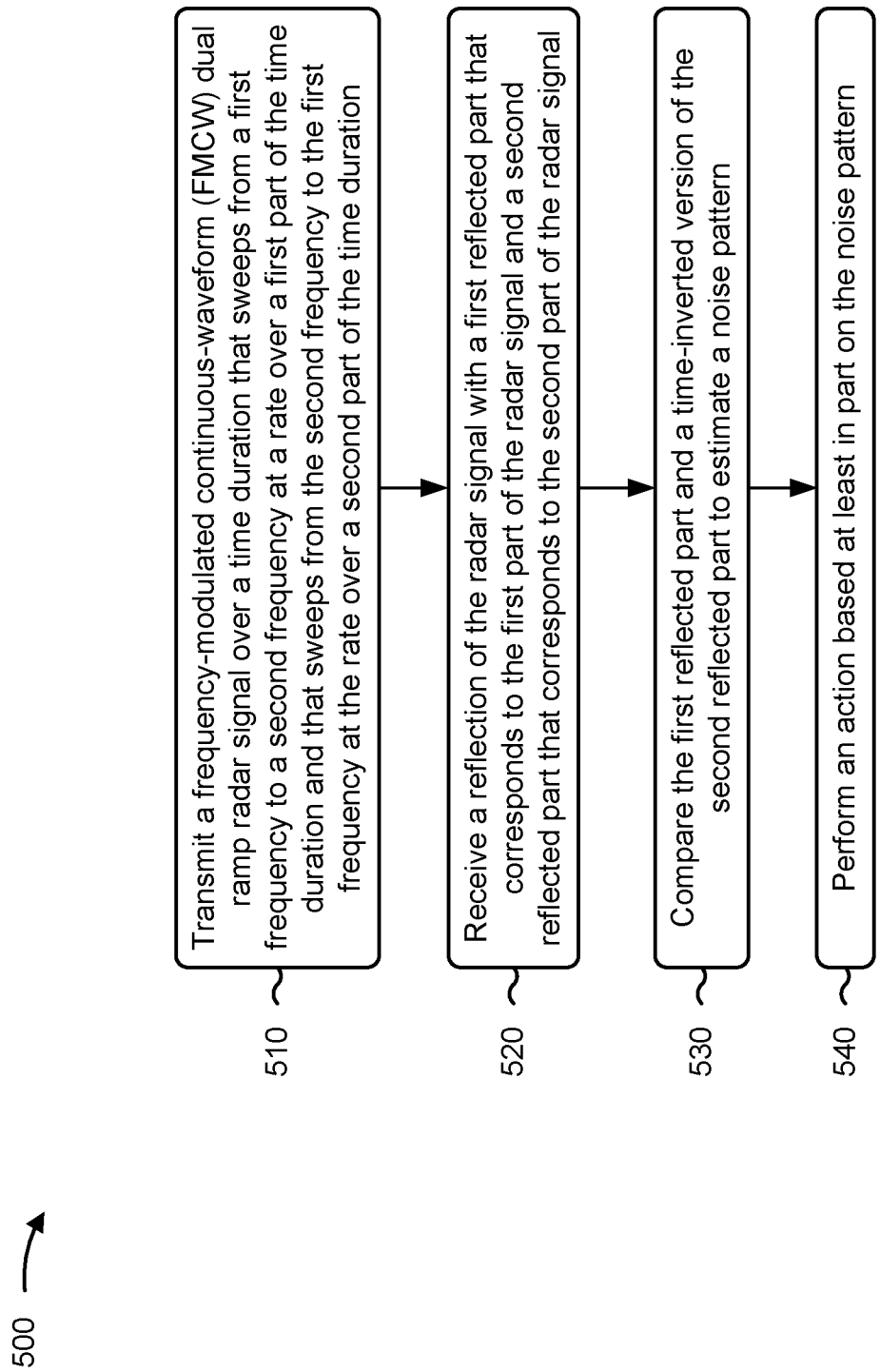

NOISE ESTIMATION WITH SIGNAL RAMPS FOR RADAR

FIELD OF THE DISCLOSURE

Aspects of the present disclosure generally relate to wireless communication and to techniques and apparatuses for estimating noise for radar using signal ramps.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a wireless device. The method may include transmitting a frequency-modulated continuous-waveform (FMCW) dual ramp radar signal over a time duration that sweeps (ramps) from a first frequency to a second frequency at a rate over a first part of the time duration and that sweeps from the second frequency to the first frequency at the rate over a second part of the time duration. The method may include receiving a reflection of the radar signal with a first reflected part that corresponds to the first part of the radar signal and a second reflected part that corresponds to the second part of the radar signal. The method may include comparing the first reflected part and a time-inverted version of the second reflected part to estimate a noise pattern. The method may include performing an action based at least in part on the noise pattern.

Some aspects described herein relate to a wireless device for wireless communication. The wireless device may include memory, one or more processors coupled to the memory, and instructions stored in the memory and executable by the one or more processors. The instructions may be executable by the one or more processors to cause the wireless device to transmit an FMCW dual ramp radar signal over a time duration that sweeps from a first frequency to a second frequency at a rate over a first part of the time duration and that sweeps from the second frequency to the first frequency at the rate over a second part of the time duration. The instructions may be executable by the one or more processors to cause the wireless device to receive a reflection of the radar signal with a first reflected part that corresponds to the first part of the radar signal and a second reflected part that corresponds to the second part of the radar signal. The instructions may be executable by the one or more processors to cause the wireless device to compare the first reflected part and a time-inverted version of the second reflected part to estimate a noise pattern. The instructions may be executable by the one or more processors to cause the wireless device to perform an action based at least in part on the noise pattern.

Some aspects described herein relate to a non-transitory computer-readable medium that stores one or more instructions for wireless communication by a wireless device. The one or more instructions, when executed by one or more processors of the wireless device, may cause the wireless device to transmit an FMCW dual ramp radar signal over a time duration that sweeps from a first frequency to a second frequency at a rate over a first part of the time duration and that sweeps from the second frequency to the first frequency at the rate over a second part of the time duration. The one or more instructions, when executed by one or more processors of the wireless device, may cause the wireless device to receive a reflection of the radar signal with a first reflected part that corresponds to the first part of the radar signal and a second reflected part that corresponds to the second part of the radar signal. The one or more instructions, when executed by one or more processors of the wireless device, may cause the wireless device to compare the first reflected part and a time-inverted version of the second reflected part to estimate a noise pattern. The one or more instructions, when executed by one or more processors of the wireless device, may cause the wireless device to perform an action based at least in part on the noise pattern.

Some aspects described herein relate to an apparatus for wireless communication. The apparatus may include means for transmitting an FMCW dual ramp radar signal over a time duration that sweeps from a first frequency to a second frequency at a rate over a first part of the time duration and that sweeps from the second frequency to the first frequency at the rate over a second part of the time duration. The apparatus may include means for receiving a reflection of the radar signal with a first reflected part that corresponds to the first part of the radar signal and a second reflected part that corresponds to the second part of the radar signal. The apparatus may include means for comparing the first reflected part and a time-inverted version of the second reflected part to estimate a noise pattern. The apparatus may include means for performing an action based at least in part on the noise pattern.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 5 is a diagram illustrating an example process performed, for example, by a wireless device, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
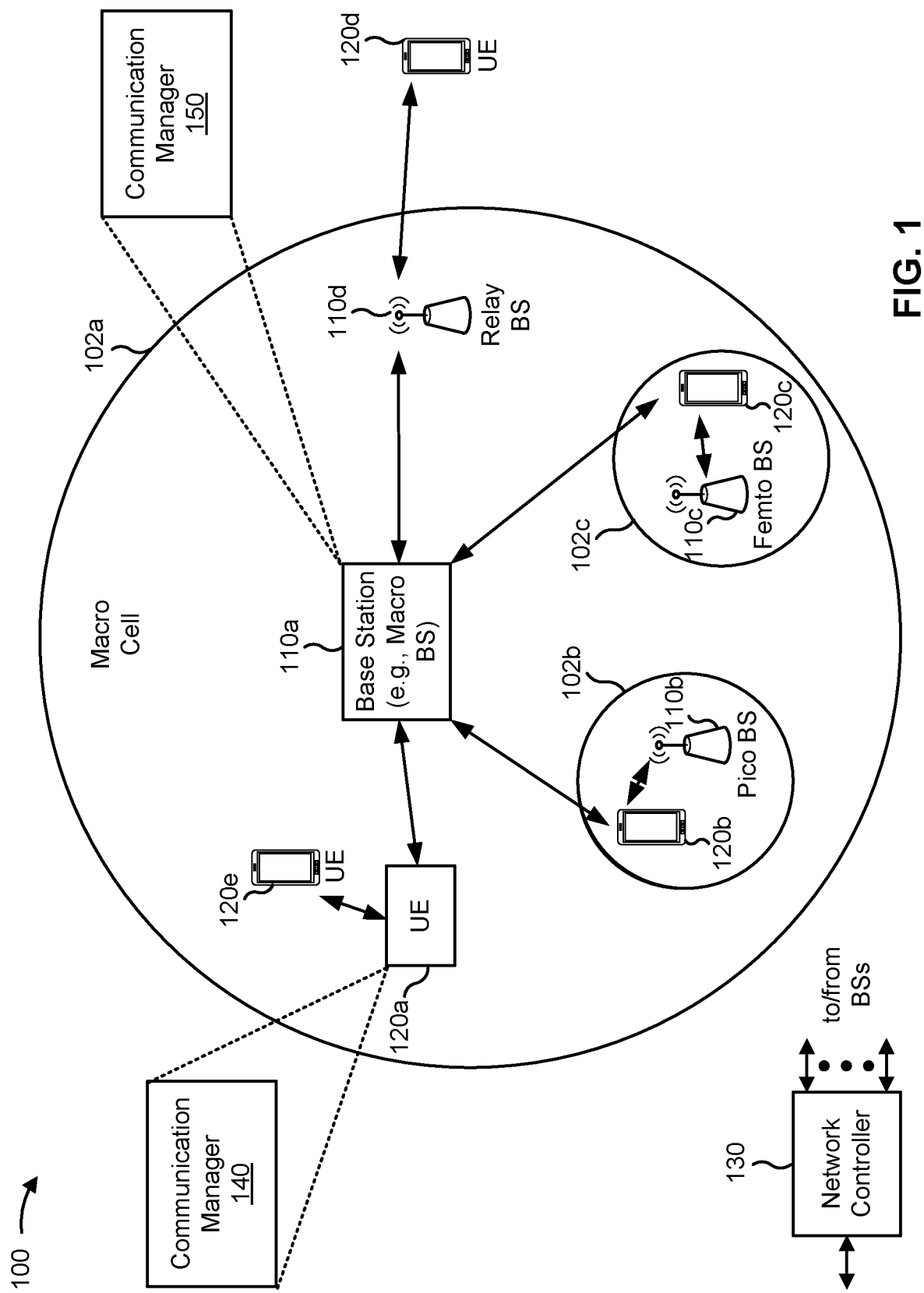
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHZ), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a wireless device (e.g., a UE 120, a base station 110, a network node, a radar device) may include a communication manager 140 or 150. As described in more detail elsewhere herein, the communication manager 140 or 150 may transmit a frequency-modulated continuous-waveform (FMCW) dual ramp radar signal over a time duration that sweeps (ramps) from a first frequency to a second frequency at a rate over a first part of the time duration and that sweeps from the second frequency to the first frequency at the rate over a second part of the time duration; receive a reflection of the radar signal with a first reflected part that corresponds to the first part of the radar signal and a second reflected part that corresponds to the second part of the radar signal; compare the first reflected part and a time-inverted version of the second reflected part to estimate a noise pattern; and perform an action based at least in part on the noise pattern. Additionally, or alternatively, the communication manager 140 or 150 may perform one or more other operations described herein.

As indicated above, FIG. 1 is provided as an example. Other examples may differ from what is described with regard to FIG. 1.

Figure 2:
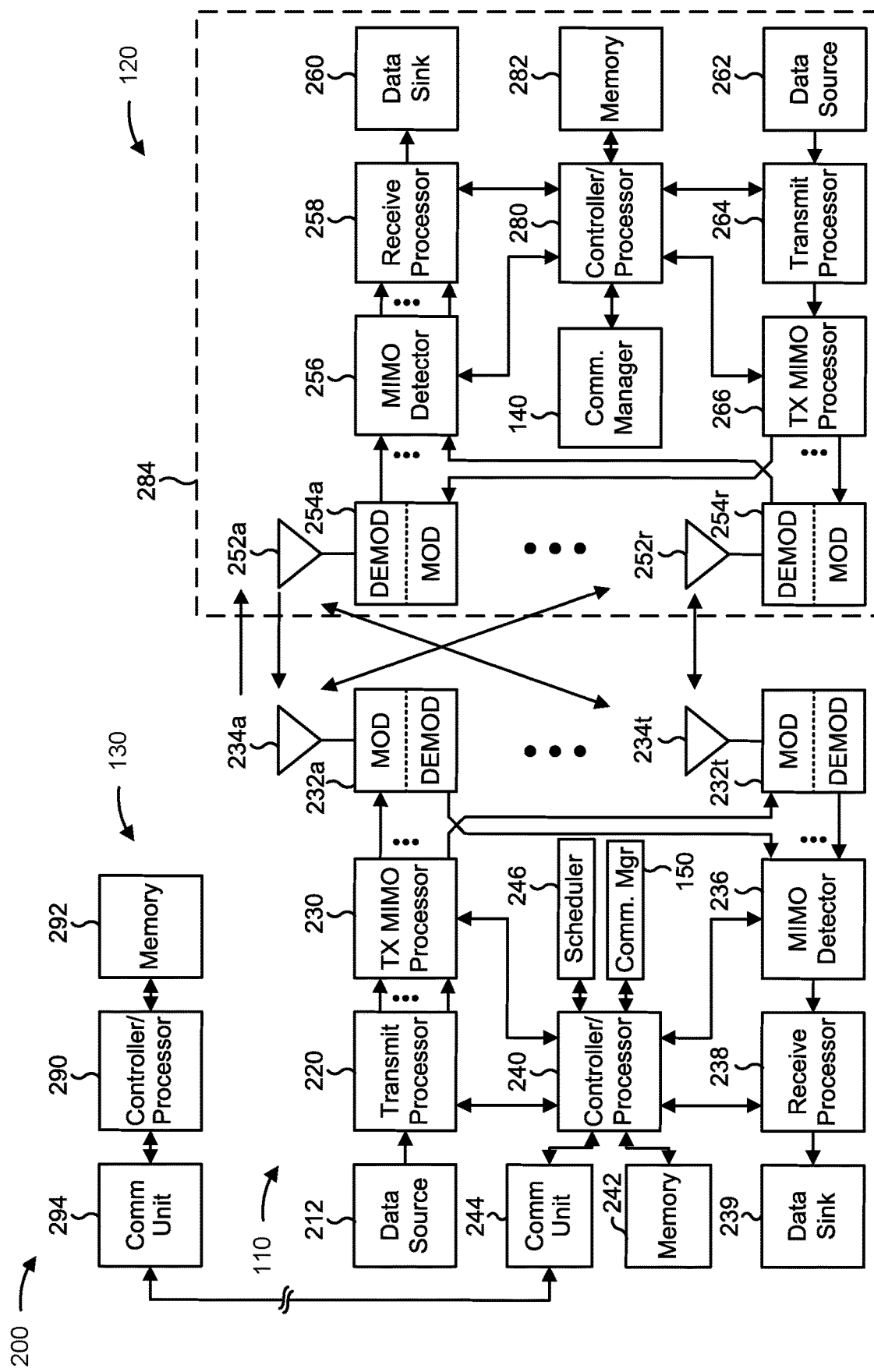
FIG. 2 is a diagram illustrating an example of a base station in communication with a user equipment in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-6).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-6).

A controller/processor of a wireless device, the controller/processor 240 of the base station 110, the controller/processor 280 of the UE 120, and/or any other component(s) of FIG. 2 may perform one or more techniques associated with using signal ramps to estimate noise, as described in more detail elsewhere herein. In some aspects, the wireless device described herein is the base station 110, is included in the base station 110, or includes one or more components of the base station 110 shown in FIG. 2. In some aspects, the wireless device described herein is the UE 120, is included in the UE 120, or includes one or more components of the UE 120 shown in FIG. 2. For example, the controller/processor 240 of the base station 110, the controller/processor 280 of the UE 120, and/or any other component(s) of FIG. 2 may perform or direct operations of, for example, process 500 of FIG. 5, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, and/or other processes as described herein. In some examples, executing instructions may include running the instructions, converting the instructions, compiling the instructions, and/or interpreting the instructions, among other examples.

In some aspects, a wireless device (e.g., a UE 120, base station 110, a network node, a radar device) includes means for transmitting an FMCW dual ramp radar signal over a time duration that sweeps from a first frequency to a second frequency at a rate over a first part of the time duration and that sweeps from the second frequency to the first frequency at the rate over a second part of the time duration; means for receiving a reflection of the radar signal with a first reflected part that corresponds to the first part of the radar signal and a second reflected part that corresponds to the second part of the radar signal; means for comparing the first reflected part and a time-inverted version of the second reflected part to estimate a noise pattern; and/or means for performing an action based at least in part on the noise pattern. In some aspects, the means for the wireless device to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the wireless device to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
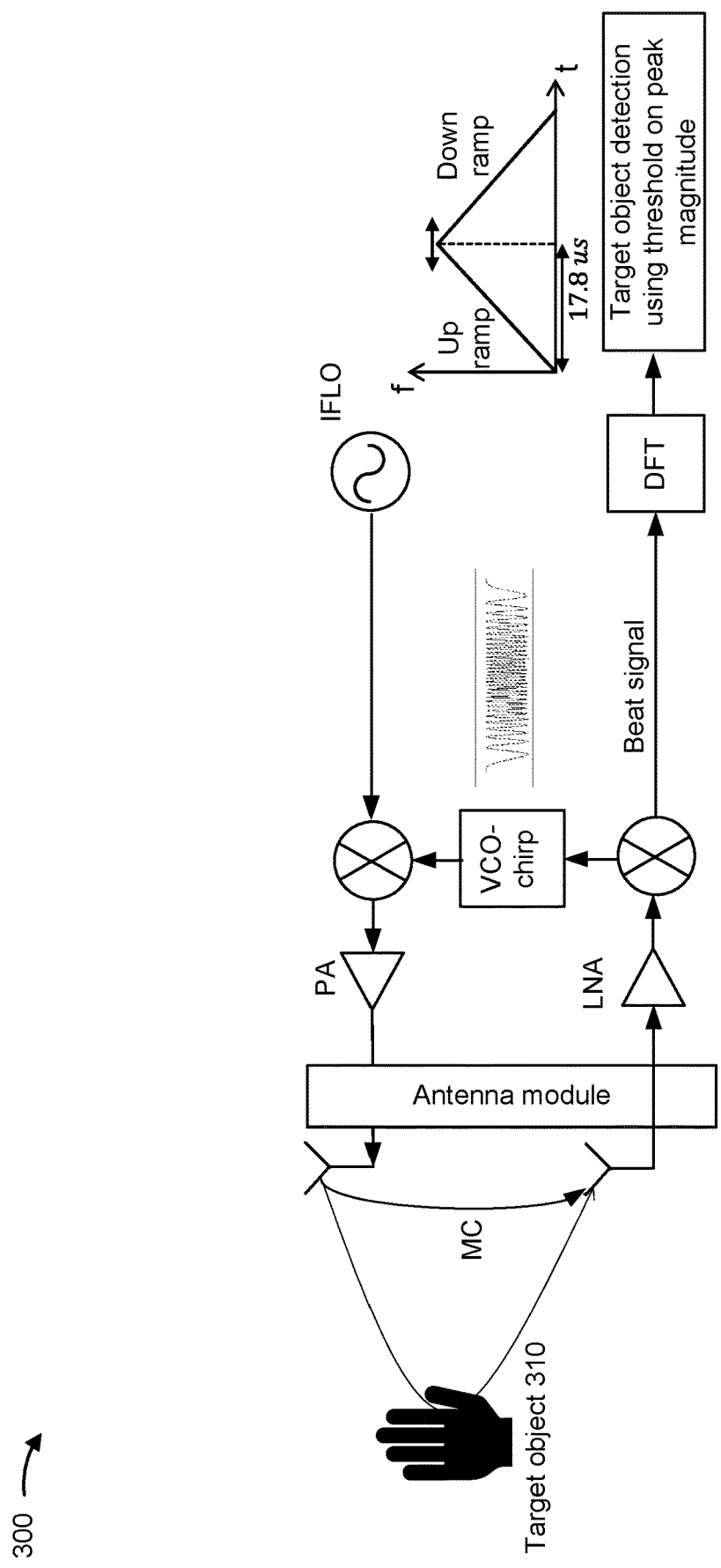
FIG. 3 is a diagram illustrating an example of a frequency-modulated continuous-wave (FMCW) radar, in accordance with the present disclosure.

FIG. 3 is a diagram illustrating an example 300 of a frequency-modulated continuous-wave (FMCW) radar, in accordance with the present disclosure.

An FMCW radar is a radar sensor that radiates a continuous sinusoidal wave that modulates (changes) in operating frequency. The wave may be transmitted over a short interval and referred to as a frequency "chirp signal." The FMCW radar may generate the chirp signal using an intermediate frequency local oscillator (IFLO) and a voltage-controlled oscillator (VCO) chirp generator. The chirp signal may be amplified with a power amplifier (PA). A wireless device may use an FMCW radar, by repurposing a 5G mmW radio frequency (RF) chain, to detect a target object 310 (e.g., body part) in proximity to the wireless device. The wireless device may use the FMCW radar to boost transmit power in compliance with Maximum Power Exposure (MPE) requirements.

In some aspects, the FMCW radar may transmit the chirp signal as a dual ramp radar signal that sweeps a bandwidth from 24 GHz to 28 GHz in an up ramp, followed by a sweep from 28 GHz to 24 GHz in a down ramp. The FMCW radar may transmit the radar signal and receive a reflected signal that is reflected off of the target object 310.

The FMCW radar may obtain a beat signal from the reflected signal by beating the reflected signal with the locally generated chirp waveform. Because of a mutual coupling (MC) of the antennas, the radar signal and the reflected signal remain the same length for the duration (signal term) of the radar signal. The beat signal may include a shift in frequency or other information that indicates a range (distance) and/or movement of the target object. Due to the continuous transmission and reception of the radar signal, the FMCW radar may suffer from leakage of the radar signal in the receiver path, due to the energy coupling resulting from the minimal physical antenna separation of the MC of the antennas. The radar signal may be strong enough to obscure the energy of the reflected signal, which makes detection of the target object very difficult. Accordingly, the FMCW radar may use a high-pass filter to separate out, from the reflected signal, the static MC component that may cause interference for the reflected signal. The beat signal may be amplified with a low-noise amplifier (LNA) and then multiplied by the transmit chirp in the receiver mixer. The resulting beat signal may have a frequency that is proportional to the round-trip delay of the reflected signal. The beat signal may then be DFTed to form a DFT spectrum. The FMCW radar may detect the target object 310 by using frequency estimation to identify a peak magnitude in the DFT spectrum that exceeds a detection threshold. The FMCW radar may estimate the distance of the target object 310 based on the beat frequency associated with the peak of the DFT that is mapped to the range R (distance) using the FMCW equation $R=c/2K \times f_b$, where c is the speed of light, K is the slope of the frequency ramp, and $f_b$ is the frequency associated with the peak of the DFT.

Conventionally, the detection threshold is a constant value that is based on the assumption of using a flat noise floor. However, RF impairment can distort the DFT spectrum such that this noise floor changes over the frequency range and hence is not flat (colored noise). In such scenarios, using a flat threshold results in poor target detection.

As indicated above, FIG. 3 is provided as an example. Other examples may differ from what is described with regard to FIG. 3.

Figure 4A:
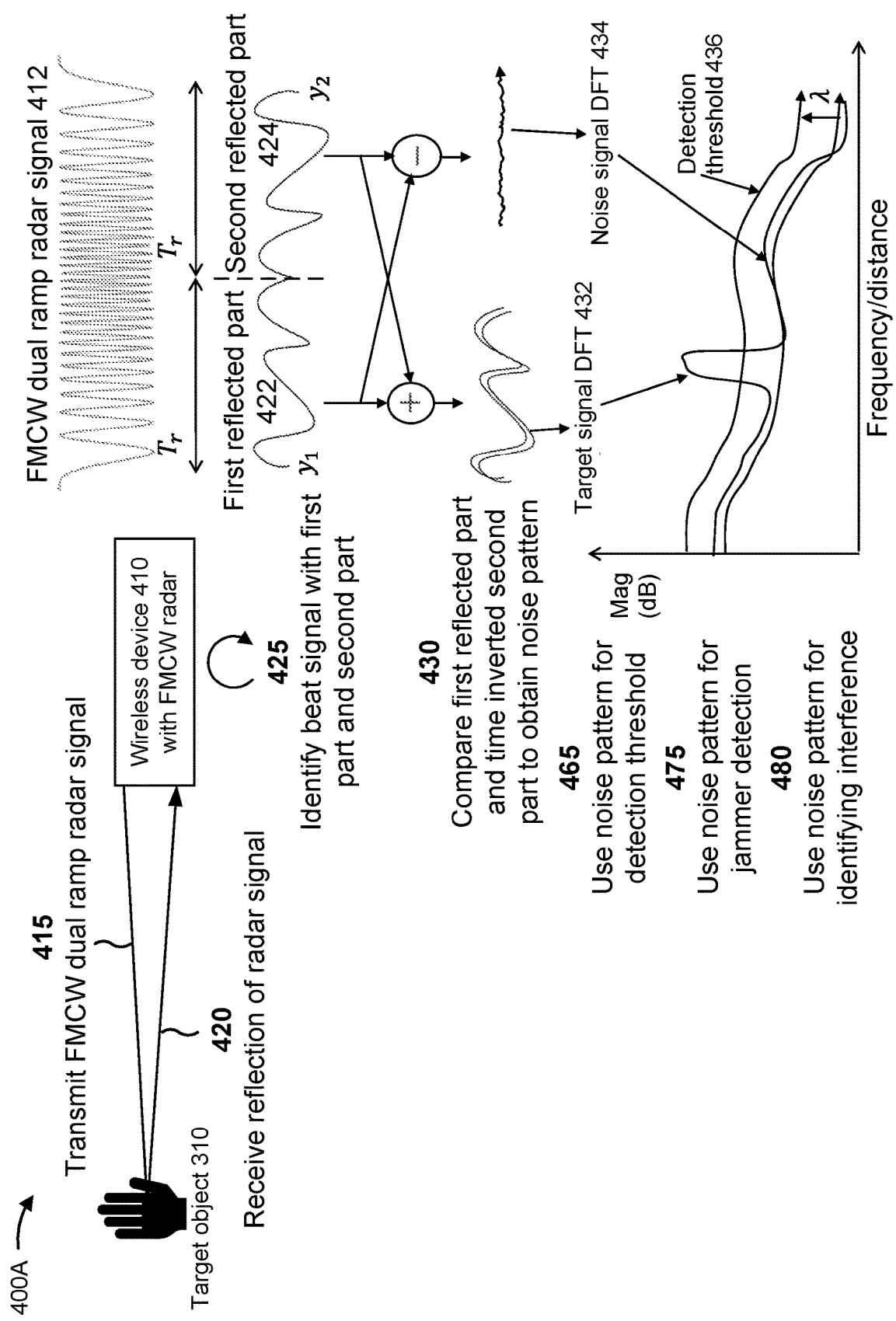
FIGS. 4A and 4B are diagrams illustrating examples of an FMCW radar that uses self-cancellation to determine a noise pattern, in accordance with the present disclosure.
Figure 4B:
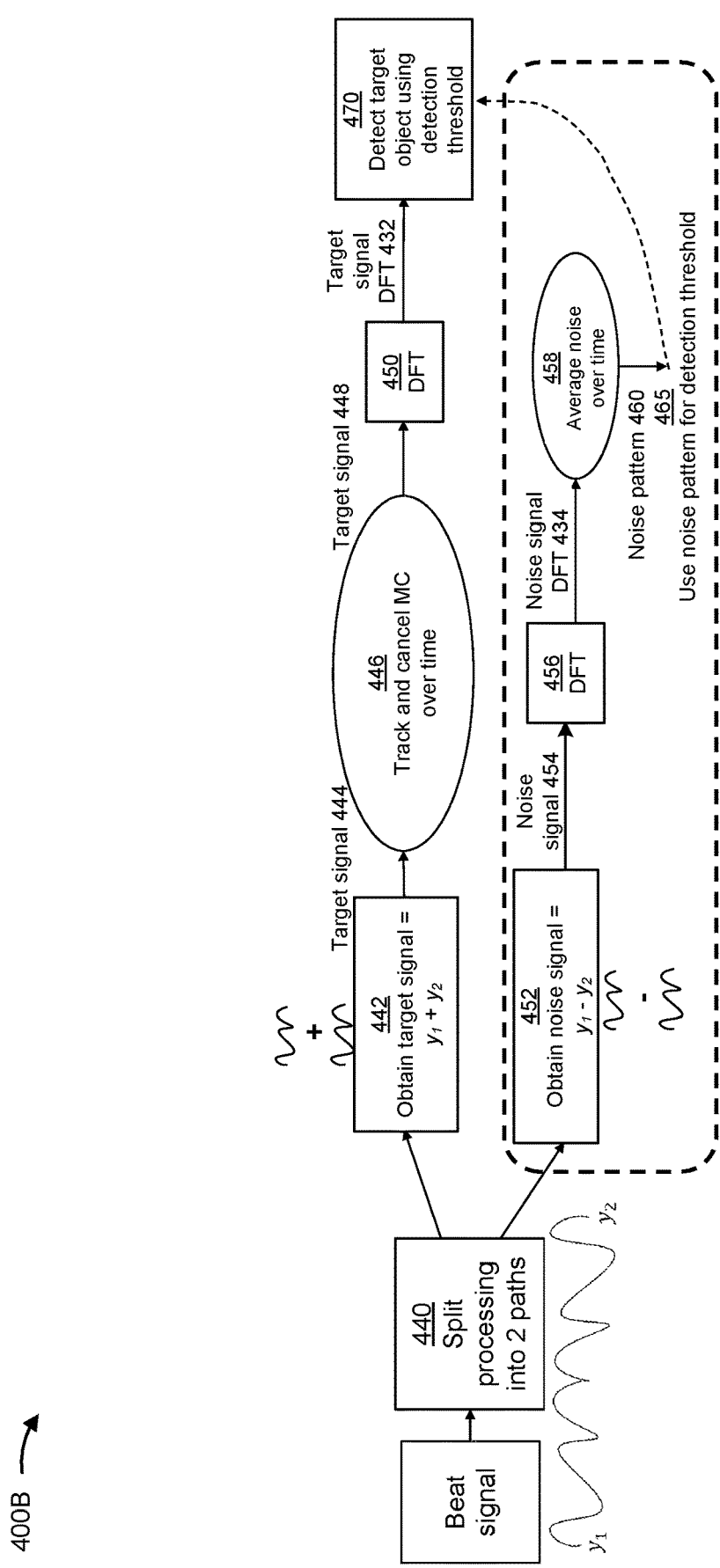

FIGS. 4A and 4B are diagrams illustrating examples 400A and 400B of an FMCW radar that uses self-cancellation to determine a noise pattern, in accordance with the present disclosure. Example 400A shows a wireless device 410 that may be configured with an FMCW radar.

According to various aspects described herein, the FMCW radar may extract an accurate estimate of a noise pattern from the reflected signal (echo) by applying a self-cancellation scheme with a dual ramp radar pulse. The self-cancellation scheme may include splitting a beat signal obtained from the reflected signal and flipping (time-inverting) a second part of the beat signal. The first part of the beat signal (e.g., up ramp) may substantially overlap with the time-inverted version of second part of the beat signal (e.g., down ramp). The FMCW radar may use the overlapping parts to cancel out the deterministic components of the reflected signal that include the MC and the target (if present). The noise component, being a random process, may be retained thus providing a robust way to estimate the noise. Since the noise is estimated across a certain quantity of frequency bins, the noise estimation tracks the colored pattern of the noise. The FMCW radar may average the noise signal computed on each of the bins of of the spectrum over time to obtain a noise pattern, which may be a frequency-dependent (colored) noise floor. Once an accurate estimation of the noise pattern is available, a detection threshold can be reliably computed by adding a given offset (in decibels (dB)) value to the noise floor. Because the noise floor is non-flat and varies according to the change in the frequency, the detection threshold may also vary and may be more accurate for detecting peaks that represent the target object 310. The detection threshold may also help the FMCW radar to avoid confusing false spur signal peaks with target signal peaks that correspond to the target object 310.

Example 400A shows a dual ramp radar signal 412 that may be an FMCW chirp signal. As shown by reference number 415, the wireless device 410 may transmit the radar signal 412. The radar signal 412 may have a first part to ramp up from a first frequency (e.g., 24 GHz) to a second frequency (e.g., 28 GHz) and a second part to ramp down (e.g., from 28 GHz to 24 GHZ). The time $T_r$ to ramp up may match the time to ramp down.

As shown by reference number 420, the wireless device 410 may receive a reflection of the dual ramp radar signal 412. The radar signal 412 may have a time duration. A first part (e.g., first half of time duration) of the radar signal 412 may correspond to a first signal component of the reflection, and a second part (e.g., second half of time duration) of the radar signal 412 may correspond to a second signal component of the reflection. The signal components may be common in both the up ramp and the down ramp because the dual ramp represents a repetition. The first signal component may be represented by s(t), and the second signal component may be flipped in time (time-inverted) and represented by $s(2T_r-t)$, because the beat signal ends at $2T_r$ and $2T_r-t$ is in the opposite direction of/from the end of the beat signal at $2T_r$. The noise component may be represented by n(t).

As shown by reference number 425, the wireless device 410 may identify, from the reflection, a beat signal with a first reflected part 422 (corresponding to the first signal component s (t) with noise component n (1)) and a second reflected part 424. The wireless device 410 may invert the second reflected part 424 in time to obtain a time-inverted version of the second reflected part 424 (corresponding to the second signal component $s(2T_r-t)$ with noise component n(t)). In other words, the wireless device 410 may split the beat signal and flip the second reflected part 424. Each reflected part may be the same length 7, with respect to time t. The wireless device 410 may filter the reflection and separate out the MC component to better identify the beat signal. The first reflected part 422 may be represented by $y_1(t)=s(t)+n_1(t)$, and the time-inverted version of the second reflected part 424 may be represented by $y_2(t)=s(2T_r-t)+n_2(t)$. The target signal estimate may be represented as $$\hat{s}(t) = \frac{y_1(t) + y_2(2T_r - t)}{2},$$

and the noise signal estimate may be represented as $$\hat{n}(t) = \frac{y_1(t) - y_2(2T_r - t)}{2}.$$

The noise signal may include the thermal noise as well as spurs and colored noise characteristics of the IFLO and other RF components that are difficult to estimate otherwise.

As shown by reference number 430, the wireless device 410 may compare the first reflected part 422 and a time-inverted version of the second reflected part 424 to obtain a noise pattern. This comparison may include obtaining a difference between the first reflected part 422 and the time-inverted version of second reflected part 424 to self-cancel the radar signal 412 and leave the noise signal. While a target signal obtained from the beat signal may be attributed to the target object 310, the noise signal may indicate the noise attributed to components of the FMCW radar, environmental noise, weak reflections, energy spurs, or other artifacts. Target signal DFT 432 indicates the target signal after applying a DFT operation, and the noise signal DFT 434 indicates the noise signal after applying a DFT transformation. DFTed versions of the signals may be used for target detection. The wireless device 410 may use the noise signal DFT 434 to determine a detection threshold 436 that is more accurate for detecting a target peak in the target signal that is caused by reflection of the radar signal 412 off of the target object 310.

Example 400B depicted in FIG. 4B is an example of the wireless device 410 processing the beat signal to obtain the noise pattern. In some aspects, as shown by reference number 440, the signal processing may be split into two paths, one path for the target signal and one path for the noise signal estimation. As shown by reference number 442, the processing for the target signal may include adding the first reflected part 422 and the time-inverted version of the second reflected part 424 to obtain target signal 444. As shown by reference number 446, the processing may include an infinite impulse response (IIR) filter and/or a recursive least squares (RLS) filter that tracks the MC component over time and that may be used to cancel the MC component to obtain target signal 448. As shown by reference number 450, the wireless device 410 may perform a DFT operation on the target signal 448 to obtain the target signal DFT 432 (target pattern).

As shown by reference number 452, the processing for the noise signal may include subtracting the time-inverted version of the second reflected part 424 from the first reflected part 422, or subtracting the first reflected part 422 from the time-inverted version of the second reflected part 424, to obtain noise signal 454. As shown by reference number 456, the wireless device 410 may perform a DFT operation on the noise signal 454 to obtain the noise signal DFT 434. As shown by reference number 458, the wireless device 410 may time average the noise signal DFT 434 across multiple observations to obtain a noise pattern 460. That is, the noise pattern 460 may be obtained independently of the signal processing chain for the target signal. This means that the estimation of the noise pattern 460 may be independent of the MC cancellation. The noise pattern 460 may avoid target peaks and may capture the sloping shape of the noise floor. By decoupling noise estimation from these time-dependent blocks, spectral contamination can be avoided when the MC component is canceled. In some aspects, the noise floor may be used as a reference to characterize the MC component (e.g., calculate MC signal-to-noise ratio (SNR)).

In some aspects, the wireless device 410 may perform an action based on the noise pattern 460. For example, as shown by FIG. 4A and by reference number 465, the wireless device 410 may use the noise pattern 460 to generate the detection threshold 436. The noise pattern 460 may be considered a noise floor, and the wireless device 410 may add a value (e.g., offset in dB) to the noise floor to form the detection threshold 436. The value may be selected to allow a peak in the signal to exceed the detection threshold 436 and be interpreted as detection of a target signal, while avoiding false positives from noisy peaks when the target is not present or signal spurs that enter the DFT spectrum from RF impairments and cause the noise floor to change across the frequency range. The noise floor may be non-flat (i.e., may be shaped across frequency (referred to as "colored noise") and may vary according to frequency or distance. Adding the offset value along the non-flat noise floor may generate a non-flat detection threshold. As shown by example 400B and by reference number 470, the wireless device 410 may detect the target object 310 using the detection threshold 436. By providing a more accurate estimate of a non-flat noise floor, target object peak detection may be improved. The noise floor may provide a threshold estimate at the frequency bins of interest and remove the strong assumptions that are involved with a flat noise floor.

Various aspects described herein may account for distortions in the detection threshold and provide for more accurate target detection. Improved target detection may improve communications and conserve processing resources. The wireless device 410 may adjust communications (e.g., transmit power, scheduling) based at least in part on detection of the target object 310, a location of the target object 310, and/or movement of the target object 310.

In some aspects, as shown by example 400A and by reference number 475, the wireless device 410 may use the noise pattern 460 to detect a jamming frequency. A frequency jammer may cause fluctuations in a small part of the waveform corresponding to the frequency spanned by the jamming signal. Since the ramp frequency sweep is symmetric, the jammer-related glitches are also symmetric. The wireless device 410 may use the noise pattern 460 to identify the jammer's operating frequency range and to adjust communications (e.g., transmit power, scheduling, beam direction) based at least in part on the signal jammer frequency.

In some aspects, as shown by reference number 480, the wireless device 410 may use the noise pattern 460 to identify signal interference and adjust communications based at least in part on the signal interference. Other techniques may utilize the noise pattern 460 that is obtained from self-cancellation of the reflected parts of the beat signal.

As indicated above, FIG. 4 is provided as an example. Other examples may differ from what is described with regard to FIG. 4.

FIG. 5 is a diagram illustrating an example process 500 performed, for example, by a wireless device, in accordance with the present disclosure. Example process 500 is an example where the wireless device (e.g., wireless device 410) performs operations associated with estimating noise using a dual ramp radar signal.

As shown in FIG. 5, in some aspects, process 500 may include transmitting an FMCW dual ramp radar signal over a time duration that sweeps from a first frequency to a second frequency at a rate over a first part of the time duration and that sweeps from the second frequency to the first frequency at the rate over a second part of the time duration (block 510). For example, the wireless device (e.g., using communication manager 140 or 150 and/or transmission component 604 depicted in FIG. 6) may transmit a dual ramp radar signal over a time duration that sweeps from a first frequency to a second frequency at a rate over a first part of the time duration and that sweeps from the second frequency to the first frequency at the rate over a second part of the time duration, as described above.

As further shown in FIG. 5, in some aspects, process 500 may include receiving a reflection of the radar signal with a first reflected part that corresponds to the first part of the radar signal and a second reflected part that corresponds to the second part of the radar signal (block 520). For example, the wireless device (e.g., using communication manager 140 or 150 and/or reception component 602 depicted in FIG. 6) may receive a reflection of the radar signal with a first reflected part that corresponds to the first part of the radar signal and a second reflected part that corresponds to the second part of the radar signal, as described above.

As further shown in FIG. 5, in some aspects, process 500 may include comparing the first reflected part and a time-inverted version of the second reflected part to estimate a noise pattern (block 530). For example, the wireless device (e.g., using communication manager 140 or 150 and/or signal processing component 608 depicted in FIG. 6) may compare the first reflected part and a time-inverted version of the second reflected part to estimate a noise pattern, as described above.

As further shown in FIG. 5, in some aspects, process 500 may include performing an action based at least in part on the noise pattern (block 540). For example, the wireless device (e.g., using communication manager 140 or 150 and/or action component 610 depicted in FIG. 6) may perform an action based at least in part on the noise pattern, as described above.

Process 500 may include additional aspects, such as any single aspect or any combination of aspects described below and/or in connection with one or more other processes described elsewhere herein.

In a first aspect, the noise pattern is a non-flat noise floor, and the performing the action includes adding a value along the non-flat noise floor to obtain a non-flat detection threshold.

In a second aspect, alone or in combination with the first aspect, the comparing includes obtaining a difference between the first reflected part and the time-inverted version of the second reflected part.

In a third aspect, alone or in combination with one or more of the first and second aspects, the comparing further includes performing a DFT operation on the difference to estimate the noise pattern.

In a fourth aspect, alone or in combination with one or more of the first through third aspects, process 500 includes averaging the difference over time to estimate the noise pattern.

In a fifth aspect, alone or in combination with one or more of the first through fourth aspects, the comparing includes using the first reflected part and the time-inverted version of the second reflected part to cancel out the radar signal from the reflection of the radar signal.

In a sixth aspect, alone or in combination with one or more of the first through fifth aspects, the first part of the time duration sweeps up in frequency, and the second part of the time duration sweeps down in frequency.

In a seventh aspect, alone or in combination with one or more of the first through sixth aspects, the first part is a first half of the time duration, and the second part is a second half of the time duration.

In an eighth aspect, alone or in combination with one or more of the first through seventh aspects, the performing the action includes identifying a signal jammer frequency from the noise pattern and adjusting communications based at least in part on the signal jammer frequency.

In a ninth aspect, alone or in combination with one or more of the first through eighth aspects, the performing the action includes identifying signal interference from the noise pattern, and adjusting communications based at least in part on the signal interference.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
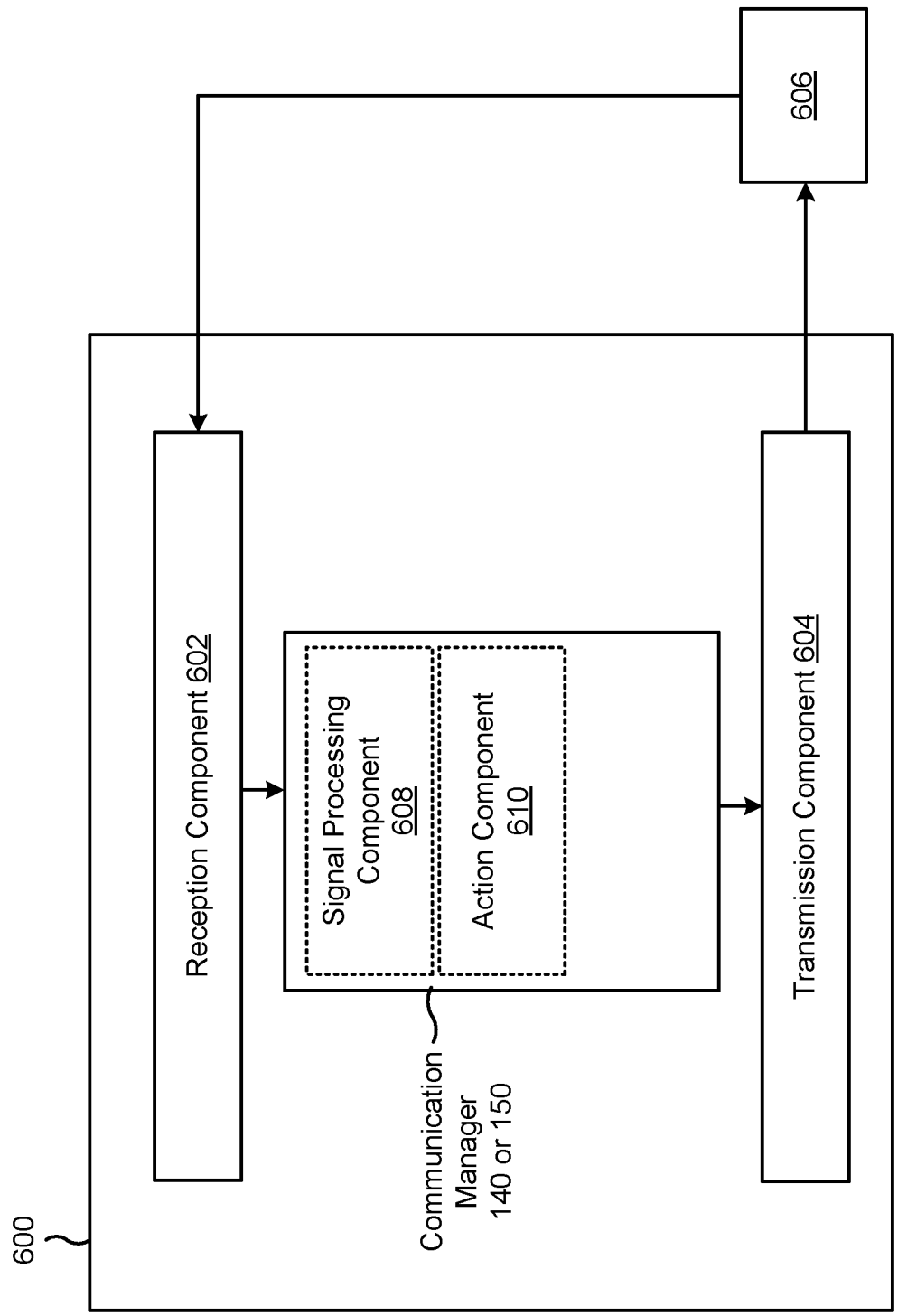
FIG. 6 is a diagram of an example apparatus for wireless communication, in accordance with the present disclosure.

FIG. 6 is a diagram of an example apparatus 600 for wireless communication. The apparatus 600 may be a wireless device (e.g., wireless device 410), or a wireless device may include the apparatus 600. In some aspects, the apparatus 600 includes a reception component 602 and a transmission component 604, which may be in communication with one another (for example, via one or more buses and/or one or more other components). As shown, the apparatus 600 may communicate with another apparatus 606 (such as a UE, a base station, or another wireless communication device) using the reception component 602 and the transmission component 604. As further shown, the apparatus 600 may include the communication manager 140 or 150. The communication manager 140 or 150 may include a signal processing component 608 and/or an action component 610, among other examples.

In some aspects, the apparatus 600 may be configured to perform one or more operations described herein in connection with FIGS. 1-4B. Additionally, or alternatively, the apparatus 600 may be configured to perform one or more processes described herein, such as process 500 of FIG. 5. In some aspects, the apparatus 600 and/or one or more components shown in FIG. 6 may include one or more components of the wireless device described in connection with FIG. 2. Additionally, or alternatively, one or more components shown in FIG. 6 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 602 may receive communications, such as reference signals, control information, data communications, or a combination thereof, from the apparatus 606. The reception component 602 may provide received communications to one or more other components of the apparatus 600. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 600. In some aspects, the reception component 602 may include one or more antennas, a modem, a demodulator, a MIMO detector, a receive processor, a controller/processor, a memory, or a combination thereof, of the wireless device described in connection with FIG. 2.

The transmission component 604 may transmit communications, such as reference signals, control information, data communications, or a combination thereof, to the apparatus 606. In some aspects, one or more other components of the apparatus 600 may generate communications and may provide the generated communications to the transmission component 604 for transmission to the apparatus 606. In some aspects, the transmission component 604 may perform signal processing on the generated communications (such as filtering, amplification, modulation, digital-to-analog conversion, multiplexing, interleaving, mapping, or encoding, among other examples), and may transmit the processed signals to the apparatus 606. In some aspects, the transmission component 604 may include one or more antennas, a modem, a modulator, a transmit MIMO processor, a transmit processor, a controller/processor, a memory, or a combination thereof, of the wireless device described in connection with FIG. 2. In some aspects, the transmission component 604 may be co-located with the reception component 602 in a transceiver.

The transmission component 604 may transmit an FMCW dual ramp radar signal over a time duration that sweeps from a first frequency to a second frequency at a rate over a first part of the time duration and that sweeps from the second frequency to the first frequency at the rate over a second part of the time duration. The reception component 602 may receive a reflection of the radar signal with a first reflected part that corresponds to the first part of the radar signal and a second reflected part that corresponds to the second part of the radar signal. The signal processing component 608 may compare the first reflected part and a time-inverted version of the second reflected part to estimate a noise pattern. The signal processing component 608 may average the difference over time to estimate the noise pattern. The action component 610 may perform an action based at least in part on the noise pattern.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of (one or more) components shown in FIG. 6 may perform one or more functions described as being performed by another set of components shown in FIG. 6.

The following provides an overview of some Aspects of the present disclosure:

Aspect 1: A method of wireless communication performed by a wireless device, comprising: transmitting a frequency-modulated continuous-waveform dual ramp radar signal over a time duration that sweeps from a first frequency to a second frequency at a rate over a first part of the time duration and that sweeps from the second frequency to the first frequency at the rate over a second part of the time duration; receiving a reflection of the radar signal with a first reflected part that corresponds to the first part of the radar signal and a second reflected part that corresponds to the second part of the radar signal; comparing the first reflected part and a time-inverted version of the second reflected part to estimate a noise pattern; and performing an action based at least in part on the noise pattern.

Aspect 2: The method of Aspect 1, wherein the noise pattern is a non-flat noise floor, and wherein the performing the action includes adding a value along the non-flat noise floor to obtain a non-flat detection threshold.

Aspect 3: The method of Aspect 1 or 2, wherein the comparing includes obtaining a difference between the first reflected part and the time-inverted version of the second reflected part.

Aspect 4: The method of Aspect 3, wherein the comparing further includes performing a discrete Fourier transform operation on the difference to estimate the noise pattern.

Aspect 5: The method of Aspect 3 or 4, further comprising averaging the difference over time to estimate the noise pattern.

Aspect 6: The method of any of Aspects 1-5, wherein the comparing includes using the first reflected part and the time-inverted version of the second reflected part to cancel out the radar signal from the reflection of the radar signal.

Aspect 7: The method of any of Aspects 1-6, wherein the first part of the time duration sweeps up in frequency, and the second part of the time duration sweeps down in frequency.

Aspect 8: The method of any of Aspects 1-7, wherein the first part is a first half of the time duration, and the second part is a second half of the time duration.

Aspect 9: The method of any of Aspects 1-8, wherein the performing the action includes: identifying a signal jammer frequency from the noise pattern; and adjusting communications based at least in part on the signal jammer frequency.

Aspect 10: The method of any of Aspects 1-9, wherein the performing the action includes: identifying signal interference from the noise pattern; and adjusting communications based at least in part on the signal interference.

Aspect 11: An apparatus for wireless communication at a device, comprising a processor; memory coupled with the processor; and instructions stored in the memory and executable by the processor to cause the apparatus to perform the method of one or more of Aspects 1-10.

Aspect 12: A device for wireless communication, comprising a memory and one or more processors coupled to the memory, the one or more processors configured to perform the method of one or more of Aspects 1-10.

Aspect 13: An apparatus for wireless communication, comprising at least one means for performing the method of one or more of Aspects 1-10.

Aspect 14: A non-transitory computer-readable medium storing code for wireless communication, the code comprising instructions executable by a processor to perform the method of one or more of Aspects 1-10.

Aspect 15: A non-transitory computer-readable medium storing a set of instructions for wireless communication, the set of instructions comprising one or more instructions that, when executed by one or more processors of a device, cause the device to perform the method of one or more of Aspects 1-10.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a wireless device, comprising:
    transmitting a frequency-modulated continuous-waveform dual ramp radar signal over a time duration that sweeps from a first frequency to a second frequency at a rate over a first part of the time duration and that sweeps from the second frequency to the first frequency at the rate over a second part of the time duration, wherein a first length of the first part of the time duration is equal to a second length of the second part of the time duration;
    receiving a reflection of the radar signal with a first reflected part that corresponds to the first part of the radar signal and a second reflected part that corresponds to the second part of the radar signal;
    comparing the first reflected part and a time-inverted version of the second reflected part to estimate a noise pattern based at least in part on a difference in a time domain between the first reflected part and the time-inverted version of the second reflected part, wherein the noise pattern is a noise floor that is frequency dependent; and
    performing an action based at least in part on the noise pattern.

2. The method of claim 1, wherein the noise floor is a non-flat noise floor, and wherein the performing the action includes adding a value along the non-flat noise floor to obtain a non-flat detection threshold.

3. The method of claim 1, wherein the comparing further includes performing a discrete Fourier transform operation on the difference to estimate the noise pattern.

4. The method of claim 1, further comprising averaging the difference over time to estimate the noise pattern.

5. The method of claim 1, wherein the comparing includes using the first reflected part and the time-inverted version of the second reflected part to cancel out the radar signal from the reflection of the radar signal.

6. The method of claim 1, wherein the first part of the time duration sweeps up in frequency, and the second part of the time duration sweeps down in frequency.

7. The method of claim 1, wherein the first part is a first half of the time duration, and the second part is a second half of the time duration.

8. The method of claim 1, wherein the performing the action includes:
    identifying a signal jammer frequency from the noise pattern; and
    adjusting communications based at least in part on the signal jammer frequency.

9. The method of claim 1, wherein the performing the action includes:
    identifying signal interference from the noise pattern; and
    adjusting communications based at least in part on the signal interference.

10. A wireless device for wireless communication, comprising:
    one or more memories; and
    one or more processors coupled to the one or more memories, the one or more memories storing instructions to be executed by the one or more processors to cause the wireless device to:
        transmit a frequency-modulated continuous-waveform dual ramp radar signal over a time duration that sweeps from a first frequency to a second frequency at a rate over a first part of the time duration and that sweeps from the second frequency to the first frequency at the rate over a second part of the time duration, wherein a first length of the first part of the time duration is equal to a second length of the second part of the time duration;

receive a reflection of the radar signal with a first reflected part that corresponds to the first part of the radar signal and a second reflected part that corresponds to the second part of the radar signal;

compare the first reflected part and a time-inverted version of the second reflected part to estimate a noise pattern based at least in part on a difference in a time domain between the first reflected part and the time-inverted version of the second reflected part, wherein the noise pattern is a noise floor that is frequency dependent; and perform an action based at least in part on the noise pattern.

11. The wireless device of claim 10, wherein the noise floor is a non-flat noise floor, and wherein the instructions, when performing the action, are further executable by the one or more processors to cause the wireless device to add a value along the non-flat noise floor to obtain a non-flat detection threshold.

12. The wireless device of claim 10, wherein the instructions, when comparing the first reflected part and the time-inverted version of the second reflected part, are further executable by the one or more processors to cause the wireless device to perform a discrete Fourier transform operation on the difference to estimate the noise pattern.

13. The wireless device of claim 10, wherein the memory further comprises instructions executable by the one or more processors to cause the wireless device to average the difference over time to estimate the noise pattern.

14. The wireless device of claim 10, wherein the instructions, when comparing the first reflected part and the time-inverted version of the second reflected part, are further executable by the one or more processors to cause the wireless device to use the first reflected part and the time-inverted version of the second reflected part to cancel out the radar signal from the reflection of the radar signal.

15. The wireless device of claim 10, wherein the first part of the time duration sweeps up in frequency, and the second part of the time duration sweeps down in frequency.

16. The wireless device of claim 10, wherein the first part is a first half of the time duration, and the second part is a second half of the time duration.

17. The wireless device of claim 10, wherein the instructions, when performing the action, are further executable by the one or more processors to cause the wireless device to:
identify a signal jammer frequency from the noise pattern; and
adjust communications based at least in part on the signal jammer frequency.

18. The wireless device of claim 10, wherein the instructions, when performing the action, are further executable by the one or more processors to cause the wireless device to:
identify signal interference from the noise pattern; and
adjust communications based at least in part on the signal interference.

19. A non-transitory computer-readable medium storing one or more instructions for wireless communication, the one or more instructions, when executed by one or more processors of a wireless device, configured to cause the wireless device to:

transmit a frequency-modulated continuous-waveform dual ramp radar signal over a time duration that sweeps from a first frequency to a second frequency at a rate over a first part of the time duration and that sweeps from the second frequency to the first frequency at the rate over a second part of the time duration, wherein a first length of the first part of the time duration is equal to a second length of the second part of the time duration;

receive a reflection of the radar signal with a first reflected part that corresponds to the first part of the radar signal and a second reflected part that corresponds to the second part of the radar signal;

compare the first reflected part and a time-inverted version of the second reflected part to estimate a noise pattern based at least in part on a difference in a time domain between the first reflected part and the time-inverted version of the second reflected part, wherein the noise pattern is a noise floor that is frequency dependent; and perform an action based at least in part on the noise pattern.

20. The non-transitory computer-readable medium of claim 19, wherein the noise floor is a non-flat noise floor, and wherein the one or more instructions, when performing the action, further cause the wireless device to add a value along the non-flat noise floor to obtain a non-flat detection threshold.

21. The non-transitory computer-readable medium of claim 19, wherein the one or more instructions further cause the wireless device to use the first reflected part and the time-inverted version of the second reflected part to cancel out the radar signal from the reflection of the radar signal.

22. The non-transitory computer-readable medium of claim 19, wherein the one or more instructions further cause the wireless device to:
identify a signal jammer frequency from the noise pattern; and
adjust communications based at least in part on the signal jammer frequency.

23. The non-transitory computer-readable medium of claim 19, wherein the one or more instructions further cause the wireless device to:
identify signal interference from the noise pattern; and
adjust communications based at least in part on the signal interference.

24. An apparatus for wireless communication, comprising:
means for transmitting a frequency-modulated continuous-waveform dual ramp radar signal over a time duration that sweeps from a first frequency to a second frequency at a rate over a first part of the time duration and that sweeps from the second frequency to the first frequency at the rate over a second part of the time duration, wherein a first length of the first part of the time duration is equal to a second length of the second part of the time duration;
means for receiving a reflection of the radar signal with a first reflected part that corresponds to the first part of the radar signal and a second reflected part that corresponds to the second part of the radar signal;
means for comparing the first reflected part and a time-inverted version of the second reflected part to estimate a noise pattern based at least in part on a difference in a time domain between the first reflected part and the time-inverted version of the second reflected part, wherein the noise pattern is a noise floor that is frequency dependent; and means for performing an action based at least in part on the noise pattern.

25. The apparatus of claim 24, wherein the noise floor is a non-flat noise floor, and wherein the means for performing the action includes means for adding a value along the non-flat noise floor to obtain a non-flat detection threshold.

26. The apparatus of claim 24, further comprising means for using the first reflected part and the time-inverted version of the second reflected part to cancel out the radar signal from the reflection of the radar signal.

27. The method of claim 1, wherein the comparing further includes separating a mutual coupling component of the reflection of the radar signal to estimate the noise pattern.

28. The wireless device of claim 10, wherein the instructions, when comparing the first reflected part and the time-inverted version of the second reflected part, are further executable by the one or more processors to cause the wireless device to separate a mutual coupling component of the reflection of the radar signal to estimate the noise pattern.

29. The method of claim 1, wherein the noise floor varies from the first frequency to the second frequency.

30. The method of claim 1, wherein the noise pattern includes one or more of:
- a spur signal peak,
- thermal noise, or
- a colored noise characteristic of a radio frequency component of the wireless device.

* * * * *